United States Patent

[11] 3,628,120

[72] Inventor Thorbjoern Roland Fredriksen
 Sunnyvale, Calif.
[21] Appl. No. 886,866
[22] Filed Dec. 22, 1969
[45] Patented Dec. 14, 1971
[73] Assignee Electroglas, Inc.
 Menlo Park, Calif.

[54] CLOSED LOOP STEPPING MOTOR CONTROL
 SYSTEM WITH SEEK REFERENCE CAPABILITY
 5 Claims, 10 Drawing Figs.
[52] U.S. Cl...................................................... 318/685,
 318/138
[51] Int. Cl....................................................... G05b 19/40
[50] Field of Search............................................ 318/685,
 603, 138

[56] References Cited
UNITED STATES PATENTS
3,414,785 12/1968 Orahood et al............... 318/603
3,465,217 9/1969 Kress............................. 318/685 X
3,497,778 2/1970 Gerber.......................... 318/685 X
3,523,230 8/1970 York............................. 318/685 X Primary Examiner—B. Dobeck
Attorney—Flehr, Hohbach, Test, Albritton & Herbert ABSTRACT: A closed loop stepping motor control system provides seek reference position capability. A disc discriminator on the output shaft of the stepping motor includes a single aperture to indicate a unique step in a single revolution. A unique single revolution is indicated by the use of a mechanical slider mounted on a linearly moving carriage in conjunction with appropriate cutouts and photocells; alternatively a limit switch is used. Appropriate logic provides for stopping the stepping motor when the reference position has been reached.

Patented Dec. 14, 1971
3,628,120
4 Sheets-Sheet 1
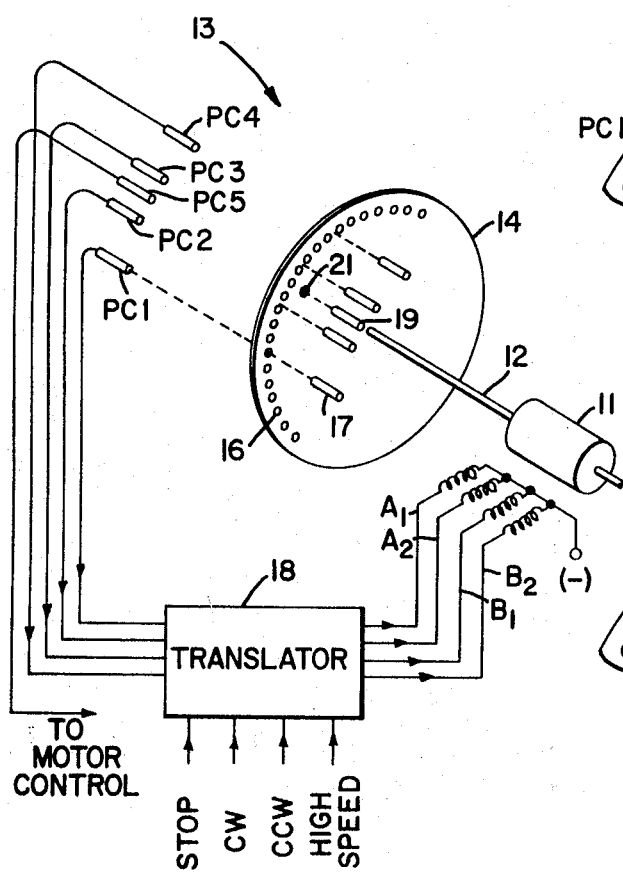
FIG_1
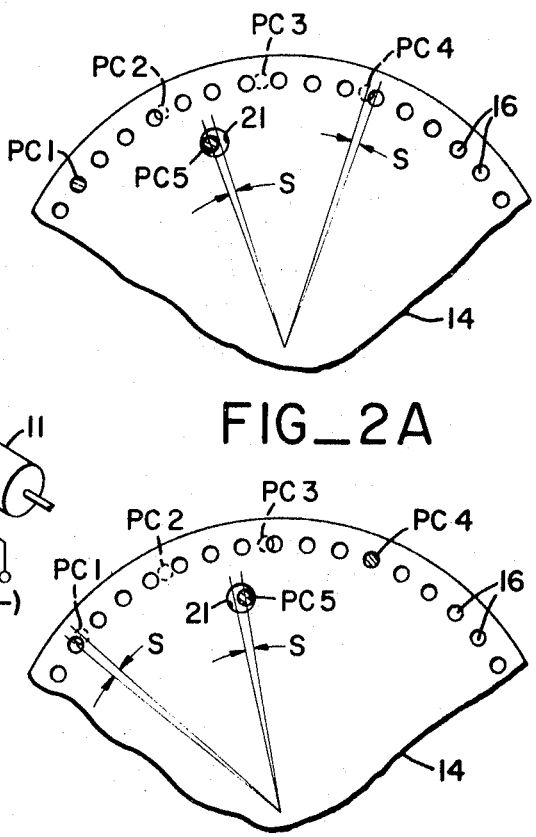
FIG_2A
FIG_2B
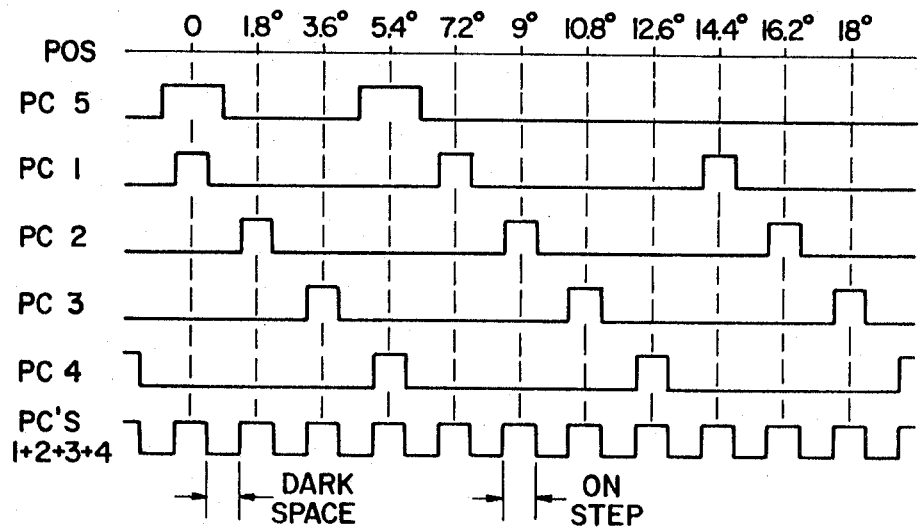
FIG_3
INVENTOR.
T. ROLAND FREDRIKSEN
BY
*Flehr, Hohbach, Test,*
*Albritton & Herbert*
ATTORNEYS

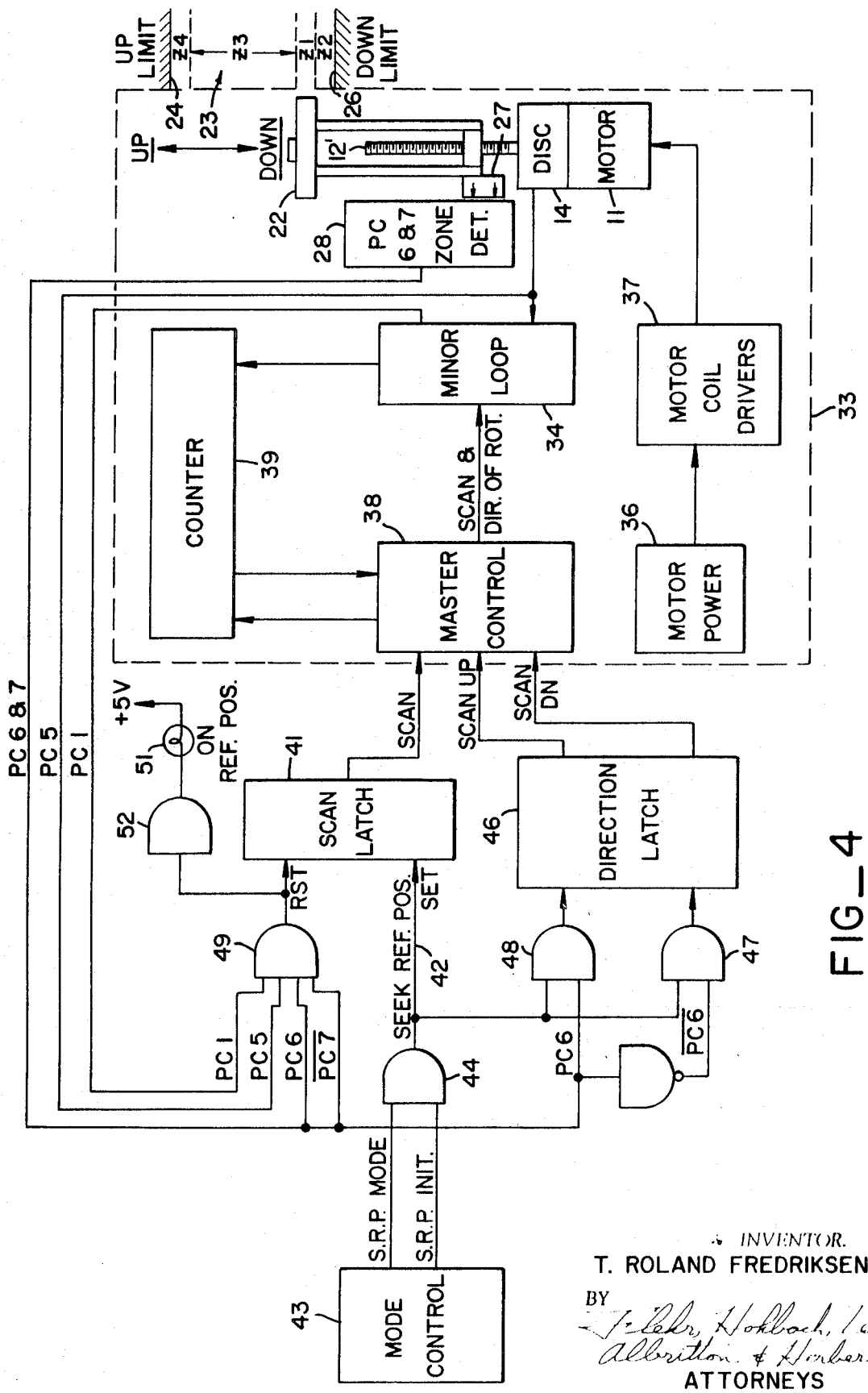
FIG_4

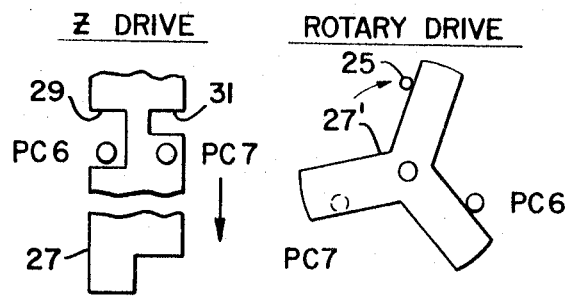
SEEK REF. POSITION
ZONE No. 1
$Z1 = PC6 \cdot \overline{PC7}$
$SRP = Z1 \cdot PC1 \cdot PC5$
FIG_5A
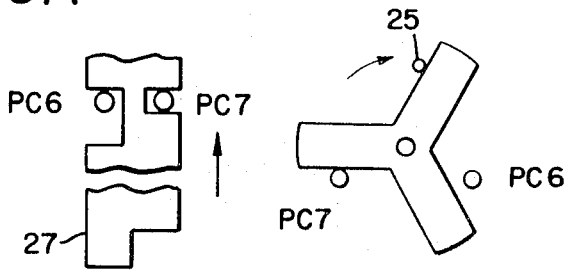
EMERGENCY STOP
ZONE No. 2
$Z2 = PC6 \cdot PC7$
FIG_5B
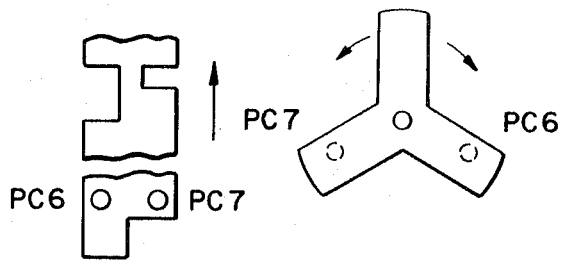
FULL SPEED ANY DIRECTION
ZONE No. 3
$Z3 = \overline{PC6} \cdot \overline{PC7}$
FIG_5C
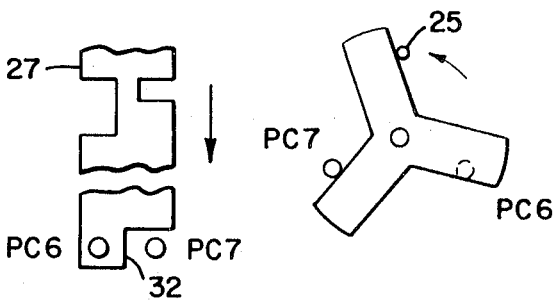
EMERGENCY STOP
ZONE No. 4
$Z4 = \overline{PC6} \cdot PC7$
FIG_5D

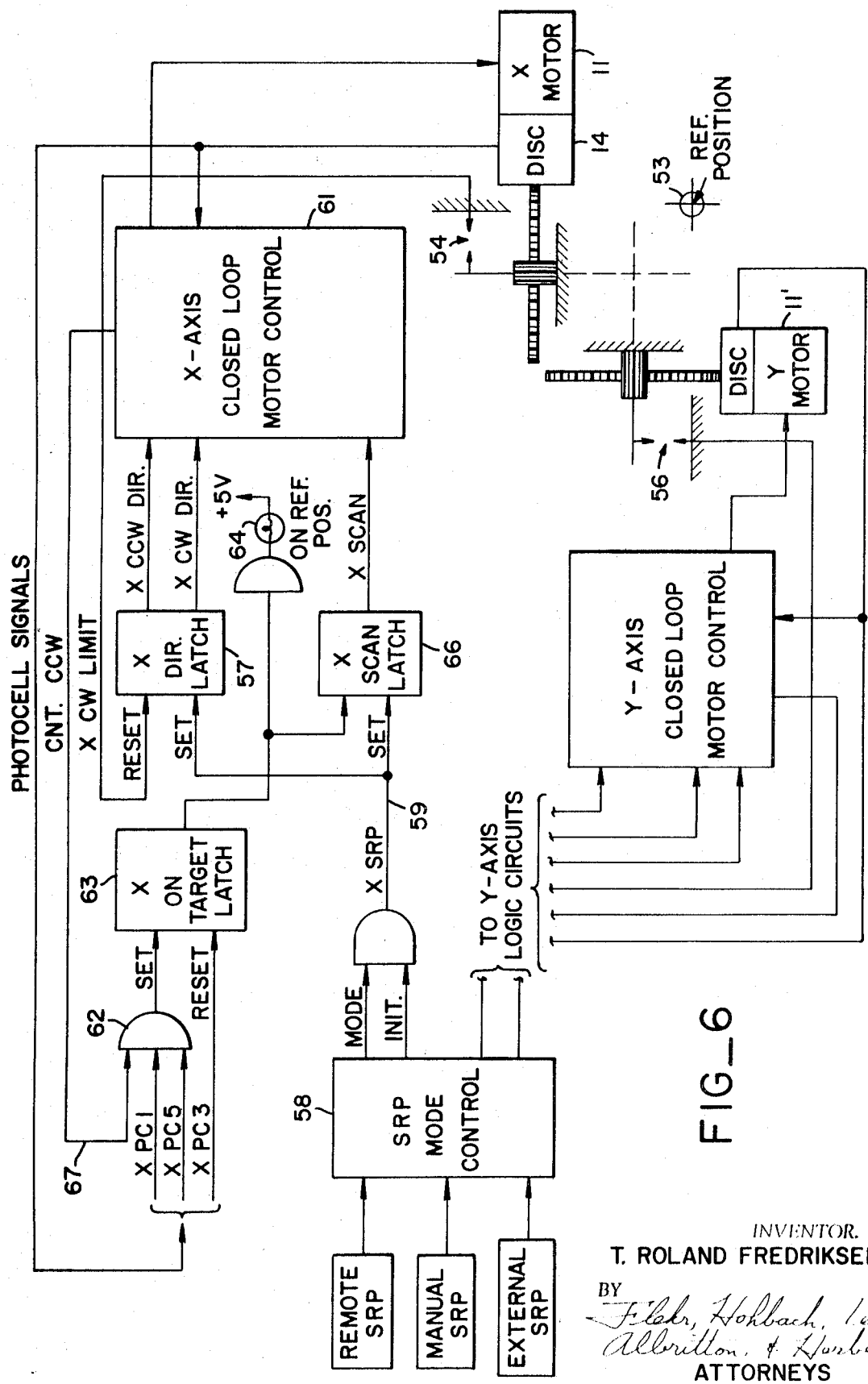
FIG_6

CLOSED LOOP STEPPING MOTOR CONTROL SYSTEM WITH SEEK REFERENCE CAPABILITY

BACKGROUND OF THE INVENTION

The present invention is directed to a closed loop stepping motor control system which has a seek reference position capability.

As a closed loop device, the stepping motor is ideally suited for positional bang-bang or time-optimal control systems. In general the control loop includes a step discriminator coupled to the output shaft of the stepping motor and a logic unit capable of making control decisions based on the digital feedback and command inputs. Such a system is disclosed in detail in U.S. Pat. No. 3,463,985.

While the foregoing closed loop system does provide accurate positioning it must be initially referenced by manual optical means. In other words the origin point of the positioning system is not automatically sought out by the major control system. This defect, of course, reduces the overall efficiency and accuracy of the positioning system.

OBJECTS AND SUMMARY OF THE INVENTION

It is therefore a general object of the present invention to provide an improved closed loop stepping motor control system.

It is another object of the invention to provide a system as above which automatically seeks out a reference or origin position.

In accordance with the above objects there is provided a closed loop stepping motor control system where the motor has a predetermined number of digital steps per revolution. The control system is of the type where the output shaft of the motor is coupled to step discriminator means for indicating the steps which the shaft passes through. The system also includes a logic unit forming a portion of the feedback circuit of the closed loop and responsive to the indication of the step discriminator means for controlling the rotation of the stepping motor. The improvement in the system BRIEF means having a portion thereof coupled to said shaft for comparing said shaft rotation to a mechanically fixed reference for indicating the shaft is in a reference zone corresponding to a unique and predetermined single revolution of the shaft. Means having a portion thereof included in the step discriminator means are responsive to the unique revolution indication for indicating a unique and predetermined step of the shaft within the unique revolution.

BRIEF DESCRIPTION OF THE DRAWINGS

FIG. 1 is a simplified perspective view of a portion of the control system embodying the present invention;

FIGS. 2A and 2B are partial elevational views of a portion of FIG. 1 which are useful in understanding the invention;

FIG. 3 is a timing diagram useful in understanding the invention;

FIG. 4 is a block diagram of one embodiment of the invention;

FIGS. 5A, 5B, 5C and 5D are illustrations of different positions of a portion of FIG. 4 along with a modification thereof; and FIG. 6 is a block diagram of another embodiment of the invention.

DETAILED DESCRIPTION OF THE PREFERRED EMBODIMENT

Referring now to FIG. 1 the minor loop control apparatus of a closed loop stepping motor control system is illustrated. This includes a stepping motor 11 which, for example, may step in increments of 1.8° thereby constituting 200 steps in a revolution. Motor 11 includes four control windings indicated as $A_1$, $A_2$ and $B_1$, $B_2$. The number of steps per revolution may, of course, be varied with different types of motors. A typical type of reversible stepping motor is obtainable from the Superior Electric Company under the trademark "SLO-SYN."

The output shaft 12 of motor 11 is coupled to a step discriminator generally indicated at 13 which includes a thin disc 14 rigidly coupled to motor shaft 12. The disc is opaque except for 50 small holes (or alternatively slots) 16 which are spaced as indicated 7.2° apart, all around a periphery of disc 14. In general the step discriminator detects the step number at which the shaft or rotor 12 is sitting or passing through photooptically.

Four light sources 17 along with four 1–designated PC1–PC4 mounted on the opposite side of disc 14 indicate successive steps through which shaft 12 and motor 11 pass. This is accomplished by locating the light sources and their accompanying photocells so that each of four possible step locations of the shaft is uniquely indicated by one photosensor or photocell. Thus, the photocells will repetitively indicate a unique step of the stepping motor every four steps. This is illustrated in the timing diagram of FIG. 3. The signal outputs of photocells 1–4 are coupled in a feedback circuit to a translator unit 18 which controls the control winding A, B of the stepping motor by comparing the digital feedback from the photocells to the command inputs to translator 18 indicated as stop, clockwise (CW), counterclockwise (CCW) and high speed. As thus far described the stepping motor control system is identical to that disclosed in the above mentioned patent.

In accordance with the invention a fifth photocell (PC5) is illuminated by light source 19 through an aperture 21 in disc 14 for indicating a unique and predetermined step of disc 14 and shaft 12 within a single revolution of the shaft. Thus the photoelectric sensor PC5 is energized once per revolution of the disc. However, the aperture 21, sensor PC5 and light source 19 are located with respect to the other apertures, sensors and light sources so as to be energized concurrently with a selected sensor.

This is illustrated more clearly in FIG. 2A which shows PC5 being illuminated through aperture 21 by its light source at the same time that PC1 is illuminated. The purpose of this simultaneous activation is so that the indication of PC5 will occur during a common time interval with a step indication of one of the other four photocells PC1–PC4. Thus it is apparent that any one of the photocells PC1–PC4 could be chosen to be energized concurrently or that the aperture 21 could merely be an extension of one of the apertures or slots 16.

In actual practice aperture 21 has been made slightly larger than s step interval designated S so that depending on the direction of rotation a different photocell (other than PC1) is initially energized. This is illustrated in FIG. 2B where photocell 4 is energized or activated at the same time as photocell 5. The foregoing is merely a matter of the circuit logic requirements. In the preferred embodiment of the invention the alternate of FIG. 2B is not utilized.

The energization of photocell 5 at the same time as photocell 1 is clearly shown in FIG. 1.

Referring now to FIGS. 4 and 5A through 5D the block diagram of FIG. 4 illustrates a motor control system which is termed a Z-type drive; that is, only a single axis or direction is under control. Specifically, the stepping motor 11 has a shaft 12' in the form of a gear which drives the carriage 22 in up and down directions. The zones of movement of carriage 22 are schematically illustrated at 23 which shows physical up and down limits 24 and 26 and four zones designated Z1 through Z4. Zones Z2 and Z4 are emergency stop zones where the carriage is approaching the physical limit, Z3 is a working zone where the carriage may proceed at full speed in any direction and Zone 1 is a reference zone which contains a unique seek reference position (SRP).

Included on carriage 22 is a sources linear 27 which moves up and down with relation to carriage 22. Thus unit is in proximity with a block 28 labeled zone detector which contains two photocells designated PC6 and PC7 along with associated light sources. FIGS. 5A through 5D illustrate the action of slider 27 more clearly. As illustrated in FIG. 5A slider 27 includes a large cutout 29 and a smaller cutout 31 which respectively expose photocells PC6 and PC7 to their associated light sources when in the proper linear position. The slider 27 has the capability of being mechanically adjusted on carriage 22 so that when window 29 exposes PC6 to allow it to be energized and it does not expose PC7, then the carriage 22 is in the zone Z1. The dimensions of window 29 and 31 are such that there is only one position of slider 27 in zone Z1 for a single revolution of a gear 12'. Thus slider 27 constitutes in conjunction with the photocells 6 and 7 means having a portion thereof coupled to shaft 12' for comparing the shaft rotation to a mechanically fixed reference (which are the photocells 6 and 7) for indicating that the shaft (and associated carriage) is in a reference zone corresponding to a unique and predetermined single revolution of the shaft. Zone 1 is mathematically expressed, as illustrated in the drawing, as the concurrent activation of PC6 and the inactivation of PC7. FIG. 5B illustrates an emergency stop where carriage 22 is moved down into zone Z2. Here the concurrence of the activation of PC6 and PC7 indicate an emergency stop. FIG. 5C illustrates the movement of carriage 22 in zone Z3 where both PC6 and PC7 are inactivated. Finally FIG. 5D illustrates an emergency stop in the upper direction for zone 4 where a cutout 32 in slide 27 allows PC7 to be illuminated.

The associated logic circuitry for implementing the activation of the photocells PC6 and PC7 in indicating the revolution in which shaft 12' is in and for thereafter indicating the unique step of that revolution and stopping the shaft in that position is shown in the remainder of FIG. 4. An overall closed loop motor control unit is illustrated by the dashed block 33 which includes a minor loop unit 34 which contains essentially the circuitry as shown in FIG. 1, a motor power unit 36, a coil driver 37 coupled to stepping motor 11 along with a master control unit 38, and a counter 39. Master control unit 38 determines whether or not to scan and the direction of scan. Counting unit 39 is reset during scanning and starts to count the number of steps after scanning is stopped to allow the master control unit to move the stepping motor any predetermined number of steps. The counter through its feedback loop between the minor loop 34 and master control 38 also corrects for overshoot errors.

Master control unit 28 is fed by three inputs designated Scan, Scan Up and Scan Down. The Scan input is initiated by setting a scan latch unit 41 which has its set input coupled to a seek reference position output line 42 which is energized by a mode control unit 43. The coincidence on AND-gate 44 of a seek reference mode indication with a seek reference position signal opens the gate and produces an output on the line 42 to set scan latch 41. A direction latch 46 is normally set to Scan Down through AND-gate 47 since PC6 except in the zone 1 and 2 positions would be inactivated; in other words, the $\overline{PC6}$ indication is coupled to AND-gate 47 to set direction latch 46 to activate the scan down control to master control unit 38. If this is not the case and the unit is already in Z1 or Z2 then an AND-gate 48 would be opened causing the directional latch 47 to be reset to the scan up condition.

In any case, when carriage 22 and the associated slider unit 27 reaches the Z1 reference zone, PC6 is energized along with the deenergization state of PC7 as shown in FIG. 5A. These two inputs are coupled to an AND-gate 49 which provides a reset input to scan latch 41. However, a coincidence condition does not occur on AND-gate 49 until a condition is fulfilled indicating that disc 14 along with the associated motor 11 and shaft 12' have arrived at a unique and predetermined step of the shaft within the unique revolution. This occurs as discussed above in conjunction with FIG. 2A when the photocell PC5 is energized in conjunction with photocell PC1. These two inputs are also coupled to AND-gate 49 and thus when the four coincidence inputs are present at AND-gate 49 scan latch 41 is reset to stop the scanning of motor 11. Carriage 22 is now in the seek reference position. The reset input signal to scan latch 41 also illuminates an On Reference Position light 51 through an inverter 52 coupled to the reset line from AND-gate 49. This coincidence condition is shown by formula in FIG. 5A where the seek reference position (SRP) is the coincidence of the carriage 22 being in the Z1 reference zone which in turn is PC6 and $\overline{PC7}$ along with the coincidence condition of the energization of both PC1 and PC5.

Slider unit 27, as is apparent, would a linear representation of the rotary motion of shaft 12' as shown in FIG. 4. However, for some applications, instead of a linear movement of a carriage 22, for example, merely a rotary drive may be desired. This modification is also illustrated in FIGS. 5A through 5D where a three-legged indicator unit 27' is shown in its different relative positions with PC6 and PC7. Such a rotary drive unit 27' would be, for example, coupled to shaft 12' through a worm gear arrangement having a rotating pin 25 where, for example, for 360 revolutions of shaft 12' the pin 25 would move one revolution and, as illustrated, engage the three legged indicator 27' only a part of one revolution. During the remainder of the pin's movement the unit 27' is spring biased to the zone 3 position. Thus the rotational type indicator device 27' functions in the same manner as the linear slider device 27.

FIG. 6 shows another application of the present invention to an X-Y axis system where the reference position indicated at 53 has two coordinates instead of one. Thus, there is an X stepping motor 11 along with a Y stepping motor 11'. However, a significant modification of FIG. 6 relative to FIG. 4 is the use of limit switches 54 and 56 to provide an indication of a reference zone Z1 of a single revolution.

For example, in the case of limit switch 54 when the X stepping motor 11 reaches its reference zone corresponding to Z1 an X-direction latch 57 is reset. Initially, the mode control unit 58 would have been actuated either from a remote, manual, or external input causing an X seek reference logic signal on line 59. This would have caused the X stepping motor 11 to be driven in a clockwise direction to move or scan toward the motor to close limit switch 54. A signal created by the closure of limit switch 54 then resets X-direction latch 57 to cause the X-axis closed loop motor control unit 61 to reverse stepping motor 11 to move in an opposite or counterclockwise direction. Such a closed loop motor control unit is similar to that of unit 33 shown in FIG. 4. The counterclockwise movement occurs until PC5 along with a PC1 indications are received from the discriminator unit 14. These are coupled into an AND-gate 62 to set the X On Target latch 63 which provides an On Reference Position indication 64 and at the same time resets the X scan latch 66 to stop the scanning action. It should be noted that a third coincidence input of AND-gate 62 is that movement be made in a counterclockwise direction. Thus, during the initial clockwise scan toward the limit switches gate 62 cannot be opened. A counterclockwise indication on line 67 is derived from the counter-circuit in the closed loop motor control unit 61 which, of course, indicates the direction of the step movement as well as the number of steps.

Thus the present invention has provided an improved stepping motor control system which has an automatic seek reference position capability. This capability can be used with either linear or rotational motion driven devices. The single revolution reference zone is obtained by use of photocells energized by a moving slider with appropriate cutouts or by limit switches. Where limit switches are used care must be taken in the initial location of the limit switches so that the gradual wear of the switches will not cause an ambiguous indication as to the unique step which is desired.

I claim:

1. A closed loop stopping motor system where said motor has a predetermined number of digital steps per revolution, said control system being of the type where the output shaft of the motor is coupled to step discriminator means for indicating the steps which the shaft passes through, said system also including a logic unit forming a portion of the feedback circuit of said closed loop and responsive to the indication of said step discriminator means for controlling the rotation of said stepping motor wherein the improvement in said system comprises: means having a portion thereof coupled to said shaft for comparing said shaft rotation to a mechanically fixed reference for indicating said shaft is in a reference zone corresponding to a unique and predetermined single revolution of said shaft; means having a portion thereof included in said step discriminator means and responsive to said unique revolution indication for indicating a unique and predetermined step of said shaft within said unique revolution.

2. A closed loop system as in claim 1 where said means for comparing said shaft rotation to a fixed reference includes means for translating the rotary motion of said shaft to linear motion.

4. A system as in claim 1 where said step discriminator means is of the type which includes a disc coupled for rotation with said output shaft the disc having apertures spaced around its periphery with a plurality of light sources and photoelectric sensors mounted on opposite sides of the disc, the alignment of said sensors being such that only one sensor is energized when the motor shaft is at any given step position said means included in said step discriminator means including one additional aperture and associated sensor and light source with such sensor being energized once per revolution of said disc such aperture, sensor and light source being located with respect to said other apertures, sensors and light sources to be energized concurrently with a selected sensor.

5. A system as in claim 1 where said mechanically fixed reference includes a limit switch.

* * * * *